United States Patent [19]

Williams, Jr. et al.

[11] Patent Number: 4,493,926
[45] Date of Patent: Jan. 15, 1985

[54] DISSOCIATING IONICALLY CROSS-LINKED SILOXANE POLYMERS

[75] Inventors: Robert E. Williams, Jr., Scotia; John R. Campbell, Clifton Park, both of N.Y.

[73] Assignee: General Electric Company, Schenectady, N.Y.

[21] Appl. No.: 568,019

[22] Filed: Jan. 4, 1984

[51] Int. Cl.$^3$ ............................................. C08F 283/00
[52] U.S. Cl. ..................... 525/474; 528/25; 528/27; 528/28; 556/413; 556/424
[58] Field of Search ............... 525/474; 528/27, 28, 528/25; 556/413, 424

[56] References Cited
U.S. PATENT DOCUMENTS 3,922,472 11/1975 Foley et al. ........................ 556/424

OTHER PUBLICATIONS

Litt & Matsuda, J. Polymer Science, vol. 19, p. 1221 (1975).
Graiver et al., J. Polymer Science, Polymer Chem. Ed., vol. 17, pp. 3559–3572, 3573–3636 (1979).

Primary Examiner—Melvyn I. Marquis
Attorney, Agent, or Firm—Richard J. Traverso; James C. Davis, Jr.; James Magee, Jr.

[57] ABSTRACT

A method is provided wherein ionically cross-linked zwitterionic siloxane polymers are solubilized by the addition of a weak base to a combination of the zwitterionic siloxane polymers and an organic solvent. Where a weak base having a high vapor pressure is utilized, the zwitterionic siloxane polymers can be recured by evaporation of the organic solvent and base.

11 Claims, No Drawings

DISSOCIATING IONICALLY CROSS-LINKED SILOXANE POLYMERS

CROSS-REFERENCE TO RELATED APPLICATIONS

This invention is related to subject matter disclosed in copending U.S. applications Ser. Nos. 568,165 and 568,018. All of the aforesaid applications are assigned to the same assignee as the present invention and all disclosures referenced above are incorporated herein by reference.

BACKGROUND OF THE INVENTION

This invention relates to ionically cross-linked siloxane polymers. More particularly, this invention relates to a method of dissociating ionically cross-linked zwitterionic siloxane polymers and also reforming the ionic cross links between dissociated zwitterionic siloxane polymers, herein referred to as "recuring".

Zwitterions are ions which are both positively and negatively charged. Common zwitterionic species are the amino sulfonates, $NH_2^+-R-SO_3^-$ and the amino carbonates, $NH_2^+-R-COO^-$; wherein R is a divalent hydrocarbon radical more particularly defined below. Zwitterionic species are typically obtained from ionizing amino acids and the like; however, siloxane polymers containing zwitterions have been prepared by Litt and Matsuda, *J. Polymer Science*, Vol. 19, p. 1221 (1975) and by Graiver et al., *J. Poly. Sci.*, Polymer Chem. Ed., Vol. 17, p. 3559 (1975). The contents of these articles are incorporated by reference herein.

Litt and Matsuda disclose a process for producing zwitterionic silanes by reacting the trifunctional aminoalkyl silanes, γ-aminopropyltriethoxysilane and N-aminoethyl-8-amino-propyltrimethoxy silane, with γ-propane sultone.

Graiver et al. disclose that siloxane polymers containing zwitterions can be obtained by treating an aminoalkyl siloxane with γ-propane sultone. The aminoalkyl siloxanes are provided by copolymerizing a dimethoxy silane having an aminoalkyl radical with a low molecular weight hydroxy-terminated polydimethylsiloxane and decamethyltetrasiloxane.

The zwitterions on the siloxane polymers provide ionic cross-linking between the siloxane polymers due to the coulombic forces exerted by the ions. An example of an ionic cross link which may exist between two siloxane polymer segments is illustrated in the following formula:

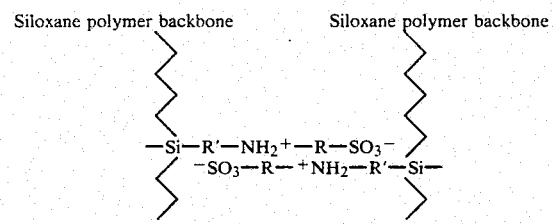

wherein R' is a divalent hydrocarbon radical of from 1 to 20 carbon atoms and R is a divalent hydrocarbon radical of from 2 to 20 carbon atoms.

These cross-links reduce the mobility of the polymer segments and increases their stiffness. For example, polydimethylsiloxanes (DP=500) are typically liquid at room temperature, yet corresponding zwitterionic polysiloxanes are solid rubbers at this temperature. Introducing zwitterions to as few as 0.5% of the silicone atoms within a siloxane fluid will provide a solid elastomeric material.

These elastomeric materials exhibit high adhesion to glass and other substrates such as, for example, wood, metal, polycarbonates, polystyrene, polyphenylene oxides and blends thereof, etc. The elastomeric properties and adhesive properties of these zwitterionic siloxanes make them suitable for use as adhesives, elastomeric adhesives, sealants, coatings, injection moldable and compression moldable rubbers and plastics, and various silicone based rubbers.

Once the ionic cross-links are formed, it is very difficult to solubilize the siloxanes in an organic solvent. For example, toluene is a suitable solvent for most polydimethylsiloxanes. However, toluene will not solubilize the zwitterionic siloxanes even when utilized in large volumes at its reflux temperature over extended periods of time.

The solubility of the zwitterionic siloxanes is an important property in determining the applications of these materials. For example, the ability to remove a coating once applied is an important feature which permits replacement of the coating when desired. The ability to solubilize the zwitterionic siloxanes is also important when utilizing these materials as adhesives. Solubilizing the adhesives permits the separation of the adhered parts, permitting replacement or reorientation of the adhered parts and adhesive.

The present invention is based on the discovery that the ionic cross-links of zwitterionic polysiloxanes can be dissociated without degradation in the presence of a weak base, permitting the zwitterionic siloxanes to be solubilized in an organic solvent, and that these ionic cross-links can be reformed upon the removal of the weak base from the zwitterionic siloxanes.

SUMMARY OF THE INVENTION

A method of solubilizing ionically cross-linked zwitterionic siloxane polymers is provided which comprises the addition of a weak base to a combination of ionically cross-linked zwitterionic siloxane polymers and an organic solvent, said weak base is preferably selected from a group consisting of ammonia, organic amines, phosphine and organic phosphines. A method for recuring the solubilized zwitterionic siloxane polymers is also provided when utilizing a weak base having a high vapor pressure.

OBJECTS OF THE INVENTION

An object of the invention is to solubilize ionically cross-linked zwitterionic siloxanes utilizing relatively small quantities of organic solvent under moderate conditions.

Another object of the present invention is to recure solubilized zwitterionic siloxanes to their original insoluble state.

Another object of the present invention is to provide a method of removing adhesives and coatings comprised substantially of ionically cross-linked zwitterionic siloxane polymers from a substrate.

Another object of the present invention is to provide a method of reusing coatings and adhesives comprised substantially of ionically cross-linked zwitterionic siloxane polymers which have been removed from the substrate.

DESCRIPTION OF THE PREFERRED EMBODIMENTS

To achieve the desired objects and other objects of this invention, an organic solvent containing a weak base is added to an ionically cross-linked zwitterionic siloxane polymer to solubilize said polymer. This procedure is suitable for solubilizing any siloxane polymer with ionic cross-links provided by zwitterions of the formulas:

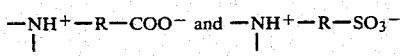

wherein R is as defined above. Examples of the zwitterionic siloxane polymers which may be solubilized by this process include those described by Litt and Matsuda and those disclosed by Graiver et al. in the articles identified above.

Those zwitterionic siloxane polymers which are preferred for use in this process include those siloxane polymers having zwitterions of the formula:

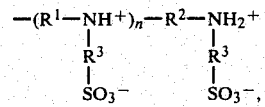

wherein $R^1$ and $R^2$ are selected from a group consisting of divalent alkylene radicals of from 1 to 10 carbon atoms and divalent aromatic radicals of from 6 to 20 carbon atoms, including alkylaryl radicals; $R^3$ is selected from a group consisting of divalent alkylene radicals of from 3 to 4 carbon atoms and divalent aromatic radicals of from 6 to 20 carbon atoms, including alkylaryl radicals; and n is an integer in the range of 0 to 5. Some of the preferred zwitterionic siloxane polymers are more particularly described in copending applications Ser. No. 568,018 and Ser. No. 568,165.

The zwitterionic siloxane polymers that are solubilized by this process have a siloxane polymer backbone onto which the zwitterions are bound. Where the zwitterions are absent, these siloxane polymers typically have repeating units of a general formula selected from group consisting of

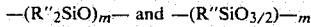

wherein each R'' is a monovalent radical independently selected from the group consisting of hydrogen, alkyl radicals of from 1 to 10 carbon atoms and aryl radicals of from 6 to 20 carbon atoms, including alkylaryl radicals, and m is preferably an integer of from 100 to about 5000. The value for m can be smaller than 100 and can be much larger than 5000. The zwitterions replace the monovalent radical R'' on the silicon atoms. Examples of the siloxane polymer backbones, i.e. siloxane polymers where the zwitterions are absent, include polydimethylsiloxane, polydimethylsiloxane-co- diphenyl siloxane, poly(methyl phenyl siloxane), etc.

The process is not limited by the siloxane polymer size. Essentially any commercially available siloxane polymer is suitable for this process once the zwitterions described above are incorporated within it. Polymers averaging about 500 siloxane monomeric units, as reported by Litt and Matsuda in the article described above, can be solubilized by this process. Smaller zwitterionic siloxane polymers, averaging approximately 100 monomeric units and larger zwitterionic siloxane polymers, averaging about 5000 monomeric units, are just as easily solubilized. However, the effectiveness of this process depends to some extent on the structure of the siloxane polymers utilized. Where there are a significant number of trifunctional silicon atoms within the polymers, there are large quantities of covalent cross-links between the siloxane polymers. Where these covalent cross-links are the dominant factor in determining the properties of the siloxane polymers, such as where the covalent cross-links exceed the number of ionic cross-links, the process comprising this invention will aid in solubilizing these zwitterionic siloxane polymers, but complete solubilization may not occur by utilizing this process alone. It may be necessary to apply heat or use larger quantities of solvent.

Zwitterionic siloxane polymers which are suitable for use in this process can be obtained by the procedure described by Graiver et al in their article identified above, wherein N-aminoethyl-γ-aminopropylmethyldimethoxysilane is copolymerized with a low molecular weight hydroxy terminated dimethylsiloxane (DP approximately 30) with decamethyltetrasiloxane as a chain terminator. The reaction takes place in the presence of a KOH catalyst (Si/K 1000 molar ratio) at 90° C. under nitrogen. The aminoalkyl siloxane polymers obtained are fluids at room temperature. The zwitterions are produced on these fluids by reaction with γ-propanesultone in toluene (70 to 80%) solutions. This provides the desired solid elastomer of a zwitterionic siloxane polymer.

Zwitterionic siloxane polymers which are suitable for use in this process are not limited to the syntheses described above. Other methods of synthesizing zwitterionic siloxane polymers will provide suitable samples for treatment by this process.

To solubilize the zwitterionic siloxane polymers, it is necessary to dissociate the ionic groups to break the ionic cross-links. This is accomplished by reacting the zwitterion with a weak base to provide a species which exhibits a lower degree of association of ionic groups. The term "weak base" as used herein describes an alkaline substance which exhibits a pH that is approximately equal to or greater than that of ammonia. A reaction product is illustrated in the equation below wherein the weak base is $(CH_3CH_2)_3N$ and the zwitterion is an amino sulfonate species of formula I.

Siloxane Polymer  II

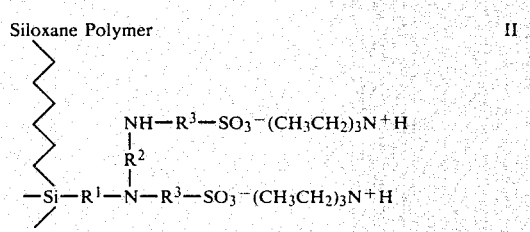

Essentially any base which ionizes in a solvent without attacking the siloxane polymer backbone can be utilized to solubilize the zwitterionic siloxane polymers. Weak bases will dissociate the ionic groups to break the ionic cross-links without attacking the siloxane polymer backbone. The more common weak bases include ammonia, organic amines, phosphine and organic phosphines. Those alkaline substances which tend to attack the siloxane polymer backbone include the metal hydroxides, such as, sodium hydroxide, potassium hydroxide, and magnesium hydroxide. The preferred weak bases are ammonia, organic amines having the formula $R^4{}_3N$, wherein each $R^4$ is independently selected from a group consisting of hydrogen alkyl radicals of from 1 to 10 carbon atoms and aryl radicals of from 6 to 10 carbon atoms, phosphine and organic phosphines of the formula $R^5{}_3P$, wherein $R^5$ is selected from a group consisting of hydrogen, alkyl radicals of from 1 to 10 carbon atoms and aryl radicals of from 6 to 20 carbon atoms. Some of the preferred organic amines and phosphines more particularly include triethylamine, trimethylamine, triphenylamine, dimethylethylamine, dimethylamine, diphenylamine, triethylphosphine, dimethylphosphine, diphenylphosphine, etc. Other weak bases which are suitable for use in this invention are ammonium carbonates, $(NH_4)_2CO_3$; ammonium bicarbonates, $NH_4HCO_3$; and organic amines and phosphines other than the preferred structures defined above, such as diamines, triamines, diphosphines, etc.

Those weak bases which are especially preferred include ammonia, phosphine, organic amines of the formula $R^4{}_3N$ and organic phosphines of the formula $R^5{}_3P$ wherein $R^4$ and $R^5$ are independently selected from the group consisting of hydrogen and alkyl radicals of from 1 to 10 carbon atoms.

With the association of ionic groups reduced sufficiently to break the ionic cross-links by the reaction with the weak base, the siloxane polymers must be dispersed within a solvent medium to effect solubilization. Solvents suitable for dispersing the dissociated zwitterionic siloxane polymers include those solvents which are suitable for dissolving the siloxane polymer backbones when without ionic groups. These typically include, toluene, xylene, chloroform, tetrahydrofuran, isopropanol, isobutanol, acetone, ketone, and other solvents the siloxane polymer backbones are typically soluble in.

It is preferable to utilize a weak base with a high vapor pressure when it is desirable to recure the solubilized zwitterionic siloxane polymers. Such a weak base will dissociate from the zwitterion upon removal of the solvent from the zwitterionic siloxane polymers, typically by evaporation. The zwitterions form ionic cross-links and recure once the base is dissociated and solvent is removed. Those bases with a high vapor pressure typically evaporate with the solvent once dissociated. Suitable weak bases with a high vapor pressure include the especially preferred bases, such as ammonia, organic amines of the formula $R^4{}_3N$, phosphine and organic phosphines of the formula $R^5{}_3P$, wherein $R^4$ and $R^5$ are selected from the group consisting of hydrogen and alkyl radicals of from 1 to 10 carbon atoms. Where these bases are utilized, evaporation of the solvent and base returns the zwitterionic siloxane polymers to their original solid form, i.e. recures the zwitterionic siloxane polymers with no observable changes in physical appearance or solubility. Once recured, the zwitterionic siloxane polymers can be solubilized once again by the addition of a weak base and organic solvent. This permits coatings comprised of zwitterionic siloxane polymers to be removed and reapplied to a substrate. Where an adhesive is comprised of zwitterionic siloxane polymers, the adhered species can be removed upon the addition of a weak base and organic solvent. The two items may be adhered once again upon evaporation of the weak base and solvent, where the weak base has a high vapor pressure.

The quantity of weak base utilized can vary over a wide range to achieve solubilization of the zwitterionic siloxane polymers. Concentrations of base within the organic solvent can equal about 0.05 molar equivalents of the ionic cross-links and above. Higher concentrations of base (0.5 molar equivalents of ionic cross-links, and above) are preferrred where complete solubilization is desired to ensure a sufficient number of ionic cross-links are broken. The lower concentrations of weak base (less than 0.1 molar equivalents of ionic cross-links) are effective where only a small quantity of ionic cross-links exist.

The process of this invention is not dependent on the volume of organic solvent utilized to achieve the desired objects. Small volumes of organic solvent with base can be used to merely soften the composition comprised substantially of ionically cross-linked zwitterionic siloxane polymers, rather than completely solubilize the polymers. A quantity of solvent which provides values for the weight ratio of solvent to siloxane polymer in the range of 0.5 to 10 is preferred.

The following examples are provided to illustrate the process comprising this invention. These examples are not provided with the intent to limit the scope of this invention to their contents. All parts are by weight unless indicated otherwise.

EXAMPLE I

This example illustrates the poor solubility of zwitterionic siloxanes in organic solvents. Toluene (5 parts) was added to the zwitterionic siloxane rubber (1-part) obtained from copolymerizing N-aminoethyl-γ-aminopropylmethyldimethoxysilane with a polydimethylsiloxane having an average degree of polymerization of 30. The mixture was allowed to stand at 23° C. for 24 hours. The mixture was decanted and about 0.8 parts of the siloxane rubber was recovered intact. Concentration of the toluene phase on a rotary evaporator yielded less than 0.2 parts by weight of a viscous, gel-like material comprised of low molecular weight ionically cross-linked siloxane rubbers and cyclic siloxanes.

EXAMPLE II

Toluene (5 parts) and triethylamine (0.1 parts) were added to the same zwitterionic siloxane rubber as in Example I (1 part). The mixture was allowed to stand at 23° C. for 24 hours to obtain a clear homogeneous solution.

EXAMPLE III

This example illustrates the ability to recure the solubilized zwitterionic siloxanes. The clear homogeneous solution of Example II was placed on a rotary evaporator to remove the toluene and base. Removal of the base and solvent yielded a solid siloxane rubber indistinguishable from the starting siloxane rubber in color and consistency.

What is claimed is:

1. A method of solubilizing zwitterionic siloxane polymers having ionic cross-links provided by zwitterions of the formulas:

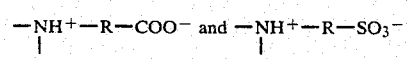

wherein R is a divalent hydrocarbon radical of from 2 to 20 carbon atoms, said method comprising adding a base to a combination of said ionically cross-linked zwitterionic siloxane polymers and an organic solvent, said base being capable of dissociating the ionic cross-links without attacking the siloxane polymer backbone.

2. A method as in claim 1 wherein the base is selected from a group consisting of ammonia, phosphine and organic phosphines of the formula $R^5{}_3P$ and organic amines of the formula $R^4{}_3N$, wherein each $R^4$ and $R^5$ are independently selected from a group consisting of hydrogen, alkyl radicals of from 1 to 10 carbon atoms and aryl radicals of from 6 to 20 carbon atoms.

3. A method as in claim 1 wherein the base is selected from the group consisting of ammonia, phosphine, organic amines of the formula $R^4{}_3N$ and organic phosphines of the formula $R^5{}_3P$ wherein $R^4$ and $R^5$ are independently selected from the group consisting of hydrogen and alkyl radicals of from 1 to 10 carbon atoms.

4. A method of recuring a solubilized zwitterionic siloxane polymer as in claim 3 comprising the evaporation of the organic solvent and said base from said solubilized zwitterionic siloxane polymers.

5. A method as in claim 1 wherein the zwitterionic siloxane polymers contain amino alkyl sulfonate radicals of the formula

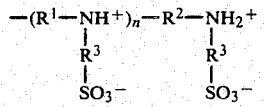

wherein $R^1$ and $R^2$ are selected from the group consisting of divalent alkalene radicals of from 1 to 10 carbon atoms and divalent aromatic radicals of from 6 to 20 carbon atoms, including alkyl aryl radicals, $R^3$ is selected from a group consisting of divalent alkalene radicals of from 3 to 4 carbon atoms and divalent aromatic radicals of from 6 to 20 carbon atoms, including alkyl aryl radicals, and n is an integer of from 0 to 5 inclusive.

6. A method as in claim 5 wherein the zwitterionic siloxane polymers have a siloxane polymer backbone with repeating units selected from the group of formulas consisting of $-(R''SiO_{3/2})-$ and $-(R_2''SiO_2)_m-$, wherein each $R''$ is a monovalent radical independently selected from the group consisting of hydrogen, alkyl radicals of from 1 to 10 carbon atoms and aryl radicals of from 6 to 20 carbon atoms and m is an integer of from 100 to 5000.

7. A method as in claim 6 wherein said amino akyl sulfonate radicals are bonded to at least 0.5% of the silicone atoms of said siloxane polymer backbone.

8. A method as in claim 1 wherein the organic solvent is selected from the group consisting of toluene, xylene, chloroform, tetrahydrofuran, isopropanol, isobutanol, acetone, ketone, and benzene.

9. A method as in claim 2 wherein the quantity of the base is equal to 0.05 molar equivalents of ionic cross-links and above.

10. A method as in claim 7 wherein the quantity of solvent provides a mole ratio of solvent to ionically cross-linked zwitterionic siloxane polymer having a value in the range of 0.5 to 1.0.

11. A method as in claim 7 wherein the siloxane polymer backbone is selected from the group consisting of polydimethylsiloxane, polymethylphenylsiloxane and polydimethyl-co-diphenylsiloxane.

* * * * *